United States Patent [19]

Knuepfer

[11] Patent Number: 4,914,303

[45] Date of Patent: Apr. 3, 1990

[54] X-RAY INTENSIFIER FOIL

[75] Inventor: Wolfgang Knuepfer, Erlangen, Fed. Rep. of Germany

[73] Assignee: Siemens Aktiengesellschaft, Berlin and Munich, Fed. Rep. of Germany

[21] Appl. No.: 111,652

[22] Filed: Oct. 22, 1987

[30] Foreign Application Priority Data

Mar. 11, 1987 [DE] Fed. Rep. of Germany ....... 3707863

[51] Int. Cl.$^4$ ................................................. G01T 1/00
[52] U.S. Cl. .................................. 250/483.1; 250/486.1
[58] Field of Search ............................ 250/483.1, 486.1

[56] References Cited

U.S. PATENT DOCUMENTS

| | | | |
|---|---|---|---|
| 3,725,704 | 4/1973 | Buchanan et al. | 250/483.1 |
| 3,829,700 | 8/1974 | Buchanan et al. | 250/483.1 |
| 3,974,389 | 8/1976 | Ferri et al. | 250/483.1 |
| 4,069,355 | 1/1978 | Lubowski et al. | 250/483.1 |
| 4,205,234 | 5/1980 | Suzuki et al. | 250/483.1 |
| 4,405,691 | 9/1983 | Yale | 250/483.1 |
| 4,472,635 | 9/1984 | Yokota et al. | 250/486.1 |
| 4,507,560 | 3/1985 | Mathers et al. | 250/483.1 |
| 4,536,436 | 8/1985 | Maeoka et al. | 250/483.1 |

FOREIGN PATENT DOCUMENTS

A-0092240 10/1983 European Pat. Off. .
A-0097377 1/1984 European Pat. Off. ......... 250/483.1

OTHER PUBLICATIONS

*The Merck Index*, Martha Windholz, Editor Published by Merck & Co., Inc., Rahway, NJ, (1983), Chemical 8329, Silicon Dioxide, p. 1220.

*Primary Examiner*—Constantine Hannaher
*Attorney, Agent, or Firm*—Hill, Van Santen, Steadman & Simpson

[57] ABSTRACT

An intensifier foil specifically employable in mammography is provided that minimizes stationary noise and enhances topical resolution. The luminophore is composed of $Gd_2O_2S$:Tb grains, whose mean grain size lies between approximately 3.4 microns to about 3.6 microns. Approximately 5% to about 15% of the luminophore grains are larger than 6.5 microns and approximately 85% to about 95% are larger than 2 microns with the luminophore otherwise having a scattered grain size distribution. The bonding agent includes approximately 0.1 to about 0.2 weight percent $SiO_2$ particles having a grain size of approximately 10 nm to about 100 nm. The substrate is constructed from a polyester foil having a dark pigment.

13 Claims, 1 Drawing Sheet

X-RAY INTENSIFIER FOIL

BACKGROUND OF THE INVENTION

The present invention relates generally to X-ray intensifier foil. More specifically, the present invention relates to an X-ray intensifier foil comprising a substrate on which a luminophore having the composition $Gd_2O_2S:Tb$ embedded in a bonding agent is applied. The bonding agent and luminophore are covered by a protective film.

An X-ray intensifier foil having a luminophore embedded in a bonding agent emits green light to an X-ray film that is in contact with the foil. Accordingly, the X-ray intensifier foil intensifies the film exposure.

Known X-ray intensifier foil having a luminophore embedded in a bonding agent have not functioned entirely satisfactorily in the area of mammography. Mammography is the photographic representation of soft tissue with the assistance of X-rays. Due to stationary noise, topical resolution difficulties and other drawbacks, known-ray intensifier foil does not function entirely satisfactorily for use in mammography.

There is therefore a need for an X-ray intensifier foil specifically designed for use in mammography.

SUMMARY OF THE INVENTION

The present invention provides an improved X-ray intensifier foil specifically for use in mammography. The X-ray intensifier foil is of the type comprising a substrate on which a luminophore having a composition $Gd_2O_2S:Tb$ embedded in a bonding agent is applied. The luminophore and bonding agent are covered by a protective film.

The X-ray intensifier foil of the present invention includes a luminophore composition wherein the mean grain size of the luminophores is approximately 3.4 micron to about 3.6 micron. The grain size of the luminophores of the present invention minimizes the stationary noise and increase topical resolution.

The X-ray intensifier foil also is comprised of a bonding agent that includes approximately 0.1 to about 0.2 weight percent $SiO_2$ particles. Preferably, the $SiO_2$ particles have a grain size of approximately 10 to about 100 nm. The grain size of the $SiO_2$ particles provides improved dispersion.

Additional features and advantages of the present invention are descried in, and will be apparent from, the detailed description of the presently preferred embodiments and from the drawing.

BRIEF DESCRIPTION OF THE PRESENTLY PREFERRED EMBODIMENTS

Figure 1:
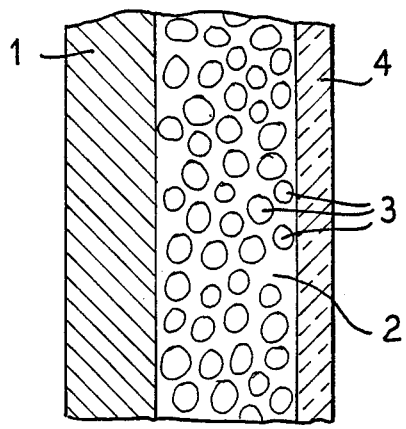
FIG. 1 illustrates is an enlarged side sectional view of a substrate on which a luminophore embedded in a bonding agent in accordance with the principles of the present invention has been applied.

The present invention provides an improved X-ray intensifier foil. As illustrated in FIG. 1, the X-ray intensifier foil includes a substrate 1 on which a luminophore 3 embedded in a bonding agent 2 is applied. As illustrated, a protective film 4 covers the luminophore 3 and bonding agent 2. The protective film 4 protects the bonding agent 2 and luminophore 3 from hostile chemical and physical influences.

Figure 2:
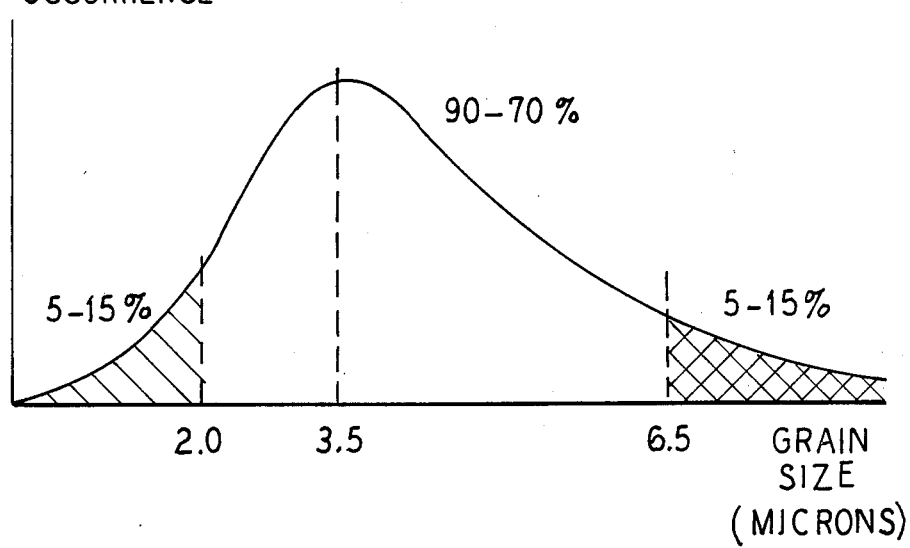
FIG. 2 is a distribution curve for the grain sizes in the composition in accordance with the principles of the present invention

The luminophore 3 comprises a plurality of grains, i.e., the grain sizes have a scattered or random distribution, subject to the following conditions. The mean grain size of the luminophore grains is approximately 3.4 microns to about 3.6 microns. Preferably, approximately 5% to about 15% of the luminophore grains have a size greater than 6.5 microns. Preferably, approximately 85% to about 95% of the luminophore grains have a size that is larger than 2 microns. FIG. 2 is a distribution curve for the grain sizes in the composition of the invention, showing these conditions. The inventor of the present invention has found that when the luminophore grains have this construction, stationary noise is minimized. Furthermore, this type of grain construction results in an increase in topical resolution.

Most preferably, approximately 10% of the luminophore grains have a size that is larger than approximately 6.5 microns. Most preferably, approximately 90% of the luminophore grains have a size that is larger than 2 microns.

The bonding agent 2 contains approximately 0.1 to about 0.2 weight percent of $SiO_2$ particles. The $SiO_2$ particles have a grain size of approximately 10 nm to about 100 nm. $SiO_2$ particles prevent the agglomeration of the fine grain luminophore particles. If the agglomeration of the fine grain luminophore particles was not prevented, this would result in an increase in stationary noise.

Preferably, the substrate 1 is formed from a dark pigmented polyester foil. Preferably, the substrate 1 has a thickness of approximately 180 microns to about 250 microns. The substrate 1 functions to suppress the reflection of the intensifier foil light.

The present invention results in an improved X-ray intensifier foil. More specifically, the present invention results in an improved X-ray intensifier foil for use in mammography that has reduced stationary noise and improved topical resolution.

It should be understood that various changes and modifications to the present preferred embodiments described herein will be apparent to those skilled in the art. Such changes and modifications can be made without departing from the spirit and scope of the present invention and without diminishing its attendant advantages. It is thereby intended that such changes and modifications be covered by the appended claims.

I claim:

1. An x-ray intensifier foil comprising:
   a substrate;
   a luminophore consisting of grains having the composition of grains having the composition $Gd_2O_2S:Tb$, the mean grain size of the luminophore is approximately 3.4 microns to about 3.6 microns with approximately 5% to about 15% of the luminophore grains having a size greater than 6.5 microns and approximately 85% to about 95% having a size greater than 2 microns and said luminophore otherwise having a scattered grain size distribution;
   a bonding agent, the luminophore grains being embedded in the bonding agent and the bonding agent being applied to the substrate; and
   a protective film for covering the luminophore and bonding agent.

2. The X-ray intensifier foil of claim 1 wherein the bonding agent comprises approximately 0.1 to about 0.2 weight percent $SiO_2$ particles.

3. The X-ray intensifier foil of claim 2 wherein the $SiO_2$ particles have a grain size of approximately 10 nm to about 100 nm.

4. The X-ray intensifier foil of claim 1 wherein the substrate is constructed from polyester foil having a dark pigment.

5. The X-ray intensifier foil of claim 4 wherein the polyester foil has a thickness of approximately 180 microns to about 250 microns.

6. The X-ray intensifier foil of claim 1 wherein approximately 10% of the luminophore grains have a size greater than 6.5 microns.

7. The X-ray intensifier foil of claim 1 wherein approximately 90% of the luminophore grains have a size greater than 2 microns.

8. An x-ray intensifier foil comprising:
a substrate;
a luminophore consisting of grains having the composition $Gd_2O_2S$:Tb, the grains having a means grain size of approximately 3.4 microns to about 3.6 microns, wherein approximately 5% to about 15% of the grains have a size greater than 6.5 microns and approximately 85% to about 95% of the grains have a size greater than 2 microns, said luminophore otherwise having a scattered grain size distribution;
a bonding agent, the luminophore grains being embedded in the bonding agent, the bonding agent and luminophore grains being coated onto a surface of the substrate, the bonding agent containing approximately 0.1 to about 0.2 weight percent of $SiO_2$ particles having a grain size of approximately 10 nm to about 100 nm; and
a protective film covering a surface of the luminophore grains and the bonding agent.

9. The X-ray intensifier foil of claim 8 wherein the substrate is constructed from a polyester foil having a dark pigment.

10. The X-ray intensifier foil of claim 9 wherein the polyester foil has a thickness of approximately 180 microns to about 250 microns.

11. The X-ray intensifier foil of claim 8 wherein approximately 10% of the luminophore grains have a size greater than 6.5 microns.

12. The X-ray intensifier foil of claim 8 wherein approximately 90% of the luminophore grains have a size greater than 2 microns.

13. An x-ray intensifier foil comprising:
a substrate constructed from a polyester foil having a dark pigment, and a thickness of approximately 180 microns to about 250 microns;
a luminophore consisting of grains having the composition $Gd_2O_2S$:Tb, the grains having a mean grain size of approximately 3.4 microns to about 3.6 microns, wherein approximately 10% of the grains have a size greater than 6.5 microns and approximately 80% have a size greater than approximately 2 microns, said luminophore otherwise having a scattered grain size distribution;
the luminophore grains being embedded in a bonding agent that is coated onto a surface of the substrate, the bonding agent containing approximately 0.1 to about 0.2 weight percent of $SiO_2$ particles having a grain size of approximately 10 nm to about 100 nm; and
a protective film covering a surface of the luminophore grains and the bonding agent.

* * * * *